Sept. 19, 1967    W. A. BARBER    3,342,642
FUEL CELL ELECTROLYTE MATRIX
Filed Dec. 10, 1964
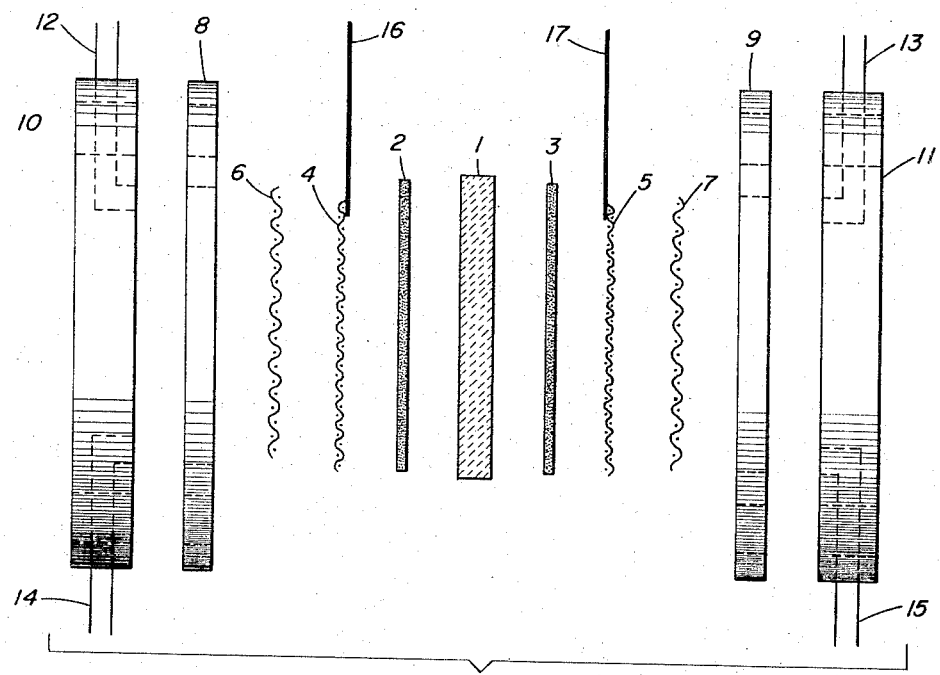
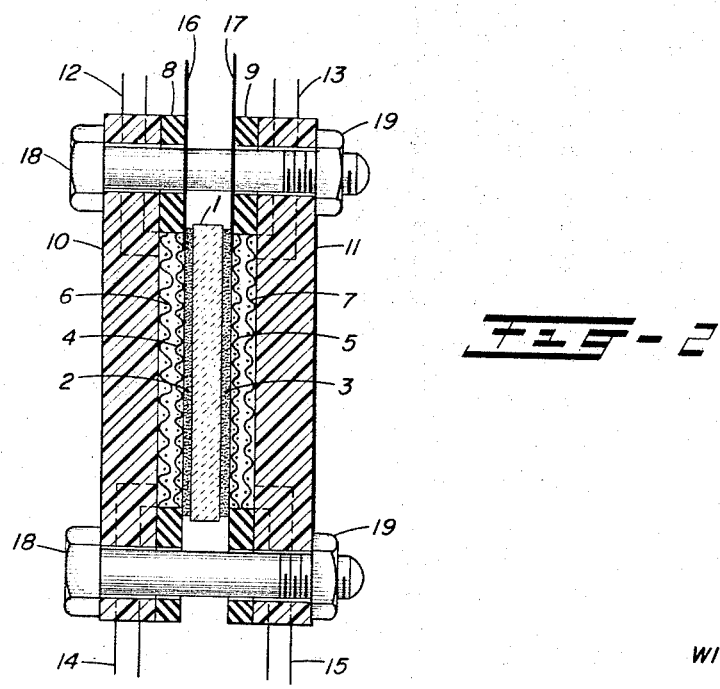
INVENTOR.
WILLIAM AUSTIN BARBER
BY
ATTORNEY

United States Patent Office 3,342,642
Patented Sept. 19, 1967

3,342,642
FUEL CELL ELECTROLYTE MATRIX
William Austin Barber, Stamford, Conn., assignor to American Cyanamid Company, Stamford, Conn., a corporation of Maine
Filed Dec. 10, 1964, Ser. No. 417,282
3 Claims. (Cl. 136—86)

This invention relates to a novel membrane or matrix for substantially immobilizing strongly alkali electrolyte in a variety of fuel cells, such as, for instance, hydrogen-air, hydrogen-oxygen, hydrazine-air or ammonia-air fuel cells, and methods for preparing the same. More particularly, it relates to an unfused, fibrillated matrix consisting essentially of a major amount of alkali-stable asbestos and a minor amount of highly cross-linked water-insolubilized polyvinyl alcohol fibers, eminently suitable for use as a vital fuel cell component.

In typical fuel cells, such as a hydrogen-oxygen gas fuel cell, the electrolyte element is confined in a gas-impermeable matrix. This matrix is usually paper, asbestos or a suitable ion exchange resin embedded in an electrolyte-retaining polymeric material, such as polyvinyl chloride. As a usual practice, an electrolyte-saturated matrix is positioned between two electrodes, comprising a catalyst and a binder-waterproofing agent. Abutting the electrodes are current collectors which facilitate both the removal of electrons from the hydrogen electrode (or the anode) to the external circuit and the introduction of electrons from the external circuit to the oxygen electrode (or the cathode).

Unfortunately, fuel cells employing alkaline electrolytes are not entirely satisfactory as a vehicle for effecting rapid diffusion of ions and ultimately as a source of electrical energy. This is because typical matrices usually employed suffer shortcomings in that they do not permit fuel cells to operate efficiently and economically. For instance, matrices made from filter paper saturated with strongly alkaline electrolyte are not economical or effective, since the paper reacts with the alkaline electrolyte and it—the paper—becomes a mass of pulp. However, matrices made from asbestos usually have no wet strength at all. Thus, the useful life of such matrices in fuel cells is unduly short. To obviate the shortcomings of filter paper and asbestos matrices, resort has been made to the use of ion exchange resins embedded in various resins. Similarly, such matrices are not wholly adequate, for the reason that water-gradients are set up in the cell. Water must then be removed from one side of the matrix with resultant dilution of electrolyte at one electrode and drying at the other. Hence, there remains an ever-present need for the provision of an efficient and economical matrix for use in a strongly alkaline electrolyte fuel cell.

It is, therefore, a principal object of the present invention to provide either a matrix or a membrane which permits enhanced efficiency and performance in a fuel cell. It is a further object to provide a matrix which permits rapid equilibration of water as well as the improved flexibility of operation both with respect to gas flow rate and temperature. It is a still further object of the invention to provide a fuel cell containing a matrix which permits a fuel cell to be operative for a prolonged period at ambient or elevated temperatures with enhanced electrical energy output. These and other objects will become apparent from a consideration of the ensuing description.

In the functioning of a typical fuel cell, the sites at which the electrochemical reactions occur at the anode and at the cathode are envisioned as involving the three phase contact of a reactant gas, a catalyst embedded in an electrode and an acidic or alkaline electrolyte. As an illustrative hydrogen-oxygen containing gas fuel cell of the type hereinbelow described, hydrogen ion and electrons are formed at the anode, whereas hydroxyl ions are formed at the cathode by the reaction of water, oxygen and electrons. The overall performance of such cells is dependent in significant measure upon the matrix separating the oxygen electrode (or cathode) from the hydrogen electrode (or anode). However, the matrix employed must be impermeable to gas flow but permeable to hydroxyl ions flowing from the cathode to the anode. An electrochemical equilibrium state is established with the formation of water primarily at the anode. Utilizing conventional matrices which are quite slow to equilibrate with respect to water formed at the anode, serious difficulty has been experienced in eliminating it with resultant malfunction of the cell.

To obviate this and other difficulties, an improved asbestos matrix has been unexpectedly found which provides for the retention of strongly alkaline electrolyte and the rapid equilibration of water throughout the matrix-electrode fuel cell structure. The novel matrix which comprises minor amounts of highly cross-linked polyvinyl alcohol fiber with which a major amount of alkali-stable asbestos is admixed, surprisingly permits water formed on the side of the anode (or hydrogen electrode) to equilibrate rapidly throughout the matrix even to the cathode (or oxygen electrode) side.

According to the present invention, there is provided a matrix prepared by the commingling of fibers formed from a highly cross-linked, polyvinyl alcohol and alkali-stable asbestos. The overall procedure, in brief, involves the steps of slurrying a major amount of alkali-stable asbestos in water and then admixing the latter with a minor amount of highly cross-linked polyvinyl alcohol fibers. Resultant slurried mixture is matted by removing water therefrom and a matrix sheet of any desired thickness is obtained. It is then dried and may be stored. When its use as a matrix in a fuel cell is required, the matrix sheet is saturated with an aqueous solution of any suitable alkali, such as sodium hydroxide or potassium hydroxide, of widely varied concentrations, such as 5 N to 13 N or higher.

In general, alkali-stable asbestos which is initially slurried is prepared, for instance, by subjecting asbestos to the action of hot aqueous alkali, such as potassium hydroxide, for from three to ten hours and, thereafter, washing the so-treated asbestos with water. In utilizing alkali-stable asbestos, it is preferred to vigorously agitate or beat it to prepare unfused, fibrillated asbestos.

Advantageously, small or minor amounts, usually between about 2% and 25%, and preferably between about 8% and 12%, of highly cross-linked, water-insolubilized polyvinyl alcohol fibers of varying lengths ranging usually from 0.25 inch to 3 inches, based on the weight of the over-all alkali-stable asbestos mixture, are also vigorously agitated or beaten prior to blending the fibers with the alkali-stable asbestos to effect fibrillation of the fibers. Usually, from one to three hours are required to fibrillate when employing conventional agitation equipment.

In order to further clarify the invention, these and other non-limitative embodiments thereof are shown in the accompanying drawing and will be described in detail in conjunction with said drawing.

In the drawing:

FIG. 1 is an exploded plan view, partially in section, of a fuel cell employing the matrix of the present invention; and FIG. 2 is a partially expanded side view, partially in section, of the fuel cell of FIG. 1.

In FIG. 1, a matrix 1, as prepared by the method of the present invention, is positioned between platinized electrodes 2 and 3. Abutting the latter electrodes are current collector screens 4 and 5. Stainless steel wire mesh spacers 6 and 7 are employed to compress the collector screens against the electrodes. This provides for better contact between the screens and the electrodes as well as the electrodes and the membrane. The wire mesh spacers are positioned exteriorly to the current collectors. To the outside of the spacers are gaskets 8 and 9 comprising any suitable inert material, such as silicone rubber or polytetrafluoroethylene. These seal as well as separate the chambers containing the reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17, connected to current collector screens 4 and 5 are the conductive members through which current flows from and to the fuel cell when the latter is in operation. The cell is secured by means of bolts 18 and nuts 19 as shown in FIG. 2.

The invention will be illustrated in conjunction with the following examples which are to be taken as illustrative only and not by way of limitation. All parts are by weight unless otherwise stated.

*Example 1*

Into a suitable reaction vessel are added 18 parts of abestos cleaned in hot 5 N potassium hydroxide (KOH) at 90° C. for six hours, filtered and treated again with fresh 5 N KOH. The latter caustic-leached asbestos is washed with water, beaten in conventional paper-making equipment for three minutes and mixed with 2 parts of highly cross-linked water insoluble polyvinyl alcohol fibers averaging one-half inch lengths, which had also been pre-beaten for seventy-five minutes. The blend which contains 10% polyvinyl alcohol fibers and 90% asbestos is made into a matrix sheet approximately 10 x 12 inch having a thickness of about 20 mils. The latter is dried on a drum dryer at 250° F. Resultant dry matrix sheet is next saturated with a suitable inorganic alkali as, for instance, 5 N KOH or 13 N KOH.

*Example 2*

A hydrogen-oxygen fuel cell as described above is assembled employing platinum electrodes. The latter contain 40 milligrams of platinum per square centimeter and are positioned on both sides of the matrix prepared in accordance with the procedure of Example 1. Such matrix is saturated with 5 N KOH. The performance of this fuel cell is compared with an identical cell using the same electrodes and a matrix consisting of 20 mil commercial asbestos board obtained from the Johns Manville Company. Comparative results at 70° C. are shown in Table I.

TABLE I

| Matrix | Current Density (in ma./cm.$^2$ *) at— | | | | |
|---|---|---|---|---|---|
| | .85 | .80 | .75 (volt) | .70 | .65 |
| 5N KOH-saturated Asbestos Matrix of Ex. 1 | 240 | 400 | 575 | 725 | 850 |
| 5N KOH-saturated Asbestos Board | 150 | 240 | 350 | 470 | 565 |

* Milliamperes per square centimeter.

*Example 3*

Example 2 is repeated in every respect except that the matrix of Example 1 above and the comparative asbestos board are saturated with 13 N KOH. The cells are operated at 100° C. with results shown in Table II below.

TABLE II

| Matrix | Current Density (in ma./cm.$^2$ *) at— | | | | |
|---|---|---|---|---|---|
| | .90 | .85 | .80 (volt) | .75 | .70 |
| 13N KOH-saturated Asbestos Matrix of Ex. 1 | 320 | 480 | 675 | 875 | 1,100 |
| 13N KOH-saturated Asbestos Board | 240 | 340 | 440 | 560 | 680 |

* Milliamperes per square centimeter.

From the above tabularized data, it will be seen that the matrix of the present invention markedly improves the efficiency of a fuel cell in that the current density at a given voltage is increased at least 30% as compared to the current density at the same voltage employing similarly alkaline saturated asbestos board.

I claim:
1. A fuel cell, wherein the matrix positioned between electrodes is a substantially self-sustaining, alkali-saturated matrix consisting of: a minor amount of cross-linked, water-insolubilized, fibrillated, polyvinyl alcohol fibers and a major amount of alkali-stable, unfused fibrillated asbestos.
2. The fuel cell of claim 1 wherein the said asbestos is present in an amount equal to about 90% and the fibers are present in an amount equal to about 10%.
3. The fuel cell of claim 1 wherein said alkali-saturated matrix comprises a potassium hydroxide-saturated matrix.

References Cited

UNITED STATES PATENTS

| 3,114,670 | 12/1963 | Iwasaki | 162—146 |
| 3,126,302 | 3/1964 | Drushella | 136—86 |
| 3,232,916 | 2/1966 | Fogle | 134—146 X |

WINSTON A. DOUGLAS, *Primary Examiner.*

ALLEN B. CURTIS, *Examiner.*

D. L. WALTON, *Assistant Examiner.*